United States Patent Office 3,380,948
Patented Apr. 30, 1968

3,380,948
N-ALKYL GLYCIDYL ETHER RHEOLOGICAL
MODIFIERS FOR PLASTISOLS
Kenneth R. Ericson, Greenhills, Ohio, Steven M. Postol,
East Baton Rouge Parish, La., and George B. Walker,
Mariemont, Ohio, assignors to The Procter & Gamble
Company, Cincinnati, Ohio, a corporation of Ohio
No Drawing. Filed Mar. 9, 1965, Ser. No. 438,380
4 Claims. (Cl. 260—30.4)

ABSTRACT OF THE DISCLOSURE

Higher $C_8$–$C_{18}$ n-alkyl glycidyl ethers are employed as rheological modifiers for polyvinyl chloride plastisols, imparting improved viscosity reduction and stabilty to the plastisols.

This invention relates to rheological modifiers for plastisols. More specifically, it relates to the use of aliphatic glycidyl ethers as additives for plastisol compositions to achieve a reduced and stabilized viscosity, and to promote other valuable and desirable properties of the plastisols and to products made therefrom.

The term "plastisol" is used generally herein to denote polyvinyl pastes which are comprised primarily of polyvinyl polymeric materials dispersed in a liquid plasticizer. In addition to a dispersion of the polymer in the liquid plasticizer, plastisols also generally contain heat and light stabilizers, and, optionally, they can contian wetting agents, filling agents or other additives. When a plastisol composition is heated, the dispersed polymer material dissolves in the liquid plasticizer and then the system gels and fuses to form a homogeneous solid mass. Because of this liquid to solid conversion without the need for pressure, plastisols are readily adaptable to simple, economical molding by a variety of methods. Well-known techniques for converting plastisols into final products include: rotational molding, slush molding, spraying, knife and reverse roll coating, hot and cold dippings, extruding and spraying.

Although many types of vinyl polymers are suitable for plastisol formulation, polyvinyl chloride is predominately and most commonly used and therefore this invention pertains primarily to polyvinyl chloride plastisol compositions.

An important consideration in preparing plastisol compositions is the end-use properties of the compositions such as enduring compatibility, stability to heat and/or light, and properties such as hardness or softness, flexability, and chemical or electrical resistance. In addition, the plastisol formulator must always be acutely aware of the viscosity characteristics of any given plastisol composition as respects the process by which it is prepared as well as ultimate storage thereof until it is to be employed in a subsequent fabricating process. Low viscosity plastisol formulations are almost always desired since this expedites forming or shaping the plastisol composition into any desired configuration or form. A low viscosity plastisol is especially important for molding articles requiring fine and intricate detail. Depending on the facilities involved, plastisol formulations are often stored for several days or even weeks before they are processed or fabricated into products. It is generally known that plastisols normally greatly increase in viscosity upon storage and are therefore often found to be unsuitable for molding after storage, even if the compositions were originally compounded to a low viscosity by using an excess of plasticizer or by other known means.

A typical problem facing a plastisol formulator is to produce a product by rotational casting from a given plastisol composition. Perhaps the plastisol on hand is perfectly satisfactory for rotational casting but will give a product which is too soft. The hardness or softness characteristics of a gelled plastisol product are normally controlled by means of the plasticizer content in the plastisol composition. To increase the hardness of the product, the level of the plasticizer is decreased. However, the plastisol may then be too viscous and unsuitable for rotational casting. A way must, therefore, be found of lowering the viscosity of the plastisol composition in spite of the lower plasticizer content, and without altering other properties in undesired ways.

There is a need, therefore, for plastisol compositions which have a sufficiently low viscosity for fabricating but which upon gelling into a finished product possess desired physical characteristics.

Accordingly, it is an object of this invention to provide polyvinyl chloride plastisol compositions containing rheological modifiers which have markedly decreased initial viscosity and which maintain a stable low viscosity upon storage.

It is another object of this invention to provide polyvinyl chloride plastisol compositions containing novel viscosity modifiers which also render improved de-aeration properties to the plastisol composition.

It is still another object of this invention to provide polyvinyl chloride plastisol compositions containing novel viscosity modifiers which also lower the brittleness temperature of the gelled plastisol products made therefrom.

It is a further object of this invention to provide polyvinyl chloride plastisol compositions containing novel viscosity modifiers which also impart other desired properties to the plastisol and to the gelled products made therefrom.

It is still a further object of this invention to provide a method of imparting a low and stable viscosity to polyvinyl chloride plastisol compositions.

According to the present invention, these and other objects are achieved by incorporating into a polyvinyl chloride plastisol composition from about 0.1 to about 60 parts per hundred parts of said polyvinyl chloride of an aliphatic glycidyl ether having the formula:

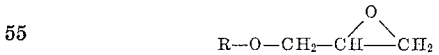

FORMULA I wherein R represents an aliphatic radical containing from about 6 to about 26 carbon atoms and preferably from 6 to about 18 carbon atoms. The term "aliphatic" herein includes saturated and unsaturated straight and branched chain alkyl radicals. Straight-chin, saturated radicals are referred to herein as "n-alkyl". In the synthesis of aliphatic glycidyl ethers of the type just described there are usually formed some diadduct and triadduct by-products. These diadducts and triadducts have the following general formulas:

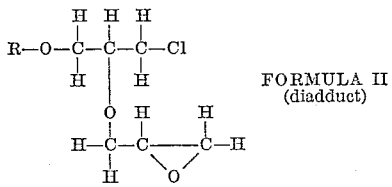

FORMULA II
(diadduct)

and

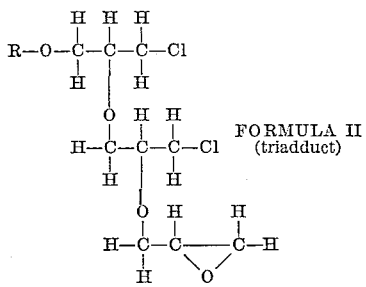

FORMULA II
(triadduct)

in which R also represents a straight or branched chain aliphatic group containing 6 to 26 carbon atoms. Aliphatic glycidyl ethers of Formula I above can be used in the herein described invention alone or in admixture with each other or in admixture the diadduct and triadduct aliphatic glycidyl ether by-produtcs represented in Formulas I and III.

Examples of ethers which can be advantageously used in this invention include compounds such as hexyl glycidyl ether, heptyl glycidyl ether, octyl glycidyl ether, 2-octylene glycidyl ether, decyl glycidyl ether, undecyl glycidyl ether, dodecyl glycidyl ether, 2-dodecylene glycidyl ether, tridecyl glycidyl ether, tetradecyl glycidyl ether, pentadecyl glycidyl ether, 2-pentadecylene glycidyl ether, hexadecyl glycidyl ether, heptadecyl glycidyl ether, octadecyl glycidyl ether, oleyl glycidyl ether, docosyl glycidyl ether, and hexacosane glycidyl ether all either alone or in admixture with each other.

A suitable method for forming aliphatic glycidyl ethers is by the reaction of an aliphatic alcohol (such as octyl alcohol, 2-octylene alcohols, decyl alcohol, tridecyl alcohol or corresponding branched chain alcohols) and epichlorohydrin in the presence of a stannic chloride catalyst. The reaction product is reacted with sodium hydroxide to form the corresponding higher aliphatic glycidyl ethers. The ethers so formed vary substantially in their physical characteristics, depending upon the length and configuration of the aliphatic chain which composes the R group. Those having n-alkyl chains ranging in length from $C_6$ to $C_{15}$ are liquids at room temperature, while those n-alkyl glycidyl ethers of chain length $C_{16}$ to $C_{26}$ are waxy solids at room temperature (23° C.). All of the higher alkyl glycidyl ethers are non-volatile at normal room temperatures and are non-toxic. However, the branched chain and unsaturated higher aliphatic glycidyl ethers are usually liquids and tend to be more volatile.

It has been discovered that the aliphatic glycidyl ethers of the type described above are highly effective and desirable rheological modifiers for polyvinyl chloride plastisol compositions. The n-alkyl saturated glycidyl ethers represent a preferred embodiment of the present invention because they tend to be more stable than unsaturated compounds or branched chain glycidyl ethers. Surprisingly, the greatest decrease in viscosity is obtained with the higher glycidyl ethers ($C_{12}$–$C_{26}$) and becomes more pronounced as the chain length increases from about $C_{12}$ to about $C_{26}$. There are, however, many situations where the lower chain length glycidyl ethers ($C_6$–$C_{12}$) can also be advantageously used.

The glycidyl ethers are added to the plastisols prior to the gelling thereof either separately or together with the plasticizer. Due to the individual differences in their physical characteristics some allowances can be made with regard to the methods by which certain of these ethers are added to the plastisol compositions. The n-alkyl glycidyl ethers containing 8 to 10 carbon atoms in their alkyl group, commonly known as octyl-decyl glycidyl ethers, can be generally defined as the ethers derived from alcohols which comprise the lower temperature cut from the distillation of coconut fatty alcohols. Those n-alkyl glycidyl ethers containing 12 to 14 carbon atoms in their alkyl group, commonly known as coconut glycidyl ethers, can be generally defined as the ethers derived from those alcohols which comprise the middle temperature cuts from the distillation of coconut fatty alcohols. Those n-alkyl glycidyl ethers containing 16 to 18 carbon atoms in their alkyl group, commonly known as tallow glycidyl ethers, can be generally defined as the ethers derived from those alcohols which comprise the higher temperature cuts from the distillation of coconut and tallow fatty alcohols. Any of these ethers or others disclosed herein can be added to the polyvinyl chloride prior to the addition of the plasticizer (before the initiation of the gelling process); or they can be added along with the plasticizer (also prior to the initiation of the gelling process). However, because the $C_{16}$ to $C_{26}$ n-alkyl glycidyl ethers are waxy solids at room temperatures they should preferably be melted prior to blending with the polyvinyl chloride or plasticizer although this is not absolutely necessary. Those glycidyl ethers having chain lengths lower than about $C_{15}$, and which are liquids at room temperature, can be added directly to the polyvinyl chloride or to the plasticizer, but the preferred procedure is to mix the ethers with the plasticizer and then add this mixture to the polyvinyl chloride.

As stated above, the preferred aliphatic glycidyl ethers of the invention are those having straight-chain saturated aliphatic radicals, herein referred to as n-alkyl glycidyl ethers. For example, outstanding results are obtained when the following preferred n-alkyl glycidyl ethers are incorporated into a plastisol composition; n-alkyl glycidyl ether wherein the alkyl radicals contain from about 14 to about 18 carbon atoms; n-alkyl glycidyl ether wherein the alkyl radicals contain from about 10 to about 16 carbon atoms; n-alkyl glycidyl ether wherein the alkyl radicals contain from about 6 carbon atoms to about 18 carbon atoms; n-alkyl glycidyl ether wherein the alkyl radicals contain from about 6 to about 12 carbon atoms. Especially preferred embodiments of this invention involve the following: n-alkyl glycidyl ether wherein the alkyl radicals contain 2%–$C_{14}$, 22%–$C_{16}$, 76%–$C_{18}$; n-alkyl glycidyl ether wherein the alkyl radicals contain 1%–$C_{10}$, 65%–$C_{12}$, 26%–$C_{14}$, 8%–$C_{16}$; n-alkyl glycidyl ether wherein the alkyl radicals contain 2%–$C_6$, 18%–$C_8$, 13%–$C_{10}$, 1%–$C_{14}$, 15%–$C_{16}$, 51%–$C_{18}$; n-alkyl glycidyl ether wherein the alkyl radicals contain 5%–$C_6$, 55%–$C_8$, 39%–$C_{10}$, 1%–$C_{12}$.

It will be understood that with regard to the aliphatic glycidyl ethers described herein, the preferred compounds are those containing mixtures of chain lengths as described above. Pure compounds of only one chain length at the upper, lower, or intermediate limits of the $C_6$ to $C_{26}$ range can be used satisfactorily but are not preferred.

The ethers of this invention can advantageously be utilized in plastisols in concentrations of from 0.1 part up to about 60 parts per hundred parts of polyvinyl chloride. Especially effective results have been noted when the glycidyl ethers are used in concentrations of from 3 to 20 parts per hundred parts of polyvinyl chloride and therefore this range is preferred.

Within the respective concentrations shown above all of the aliphatic glycidyl ethers of the $C_6$ to $C_{26}$ group are viscosity reducers and/or viscosity stabilizers. The term "viscosity stabilizer," as used herein, denotes an agent which, when added to a plastisol, reduces the rate of viscosity increase that normally occurs during storage of the plastisol composition. The glycidyl ethers in the $C_{12}$ to $C_{26}$ group are especially highly efficient viscosity reducers, a surprising phenomenon especially in light of the increase in individual viscosity of the ethers per se with increasing length of the aliphatic chain. In addition to their ability to markedly reduce plastisol viscosity and to stabilize the viscosity, they are non-toxic, relatively non-volatile, and do not interfere with the other components of the plastisol. Further, these rheological modifiers impart other desired physical properties to the plastisol such as lower surface tension and easier de-aeration. Ease of de-aeration means that a lower vacuum is necessary and the process time needed to de-aerate the plastisol is considerably reduced. In addition, a cost savings is achieved by reducing the number of rejects caused by bubbles, blisters, or air pockets in the fused products when such easier de-aeration has been effected. It is believed that the low viscosity and lower surface tension of plastisol compositions containing the aliphatic glycidyl ethers of this invention play a significant role in this improved de-aeration. The use of the ethers of the present invention promotes easier processing of plastisols as well as enabling smooth, uniform products to be made therefrom.

In addition to all of the hereinabove named advantages realized from using the aliphatic glycidyl ethers of this invention as viscosity reducers and stabilizers in polyvinyl chloride plastisols, these ethers impart excellent heat and light stabilization to the gelled plastisol products in the same manner as conventional heat and light stabilizers and they thus serve a multiple purpose. Further, these ethers impart a desired lower brittleness temperature to the gelled plastisol products. Many other viscosity modifiers for plastisols have been known and used. However, the viscosity reduction and viscosity stability realized from the aliphatic ethers of the present invention are outstanding and superior as compared to that obtained from the use of most previously known viscosity modifiers such as waxes, oils and esters, including epoxy varieties. It is unexpected that the viscosity modifiers disclosed herein are outstanding as compared to known modifiers. It is especially surprising that the improvement in viscosity characteristics increases with increasing molecular weight, i.e., $C_{26} > C_{16}-C_{18} > C_{12}-C_{14} > C_6C_{10}$. Also unexpectedly, the higher (solids at room temperatures) n-alkyl glycidyl ethers contribute more than the liquid glycidyl ethers to lower brittleness temperatures in addition to improved viscosity characteristics.

As stated above, the rheological characteristics of plastisols containing the aliphatic ethers of this invention are superior and outstanding as compared to plastisols containing previously known modifiers. Furthermore, none of the previously known viscosity modifiers impart all of the other desirable characteristics to plastisols or products made therefrom as do the aliphatic glycidyl ethers disclosed herein, namely; lower surface tension, and easier de-aeration of the plastisol, lower brittleness temperature, higher strength, and especially heat and light stabilization of products made therefrom. Also the viscosity reduction obtained from this invention is achieved while the gel temperature of the plastisol does not appreciably increase. A further advantage realized by the use the ethers of this invention is that they are substantially non-toxic.

The aliphatic glycidyl ethers of this invention are very compatible with substantially all plasticizers known in the art and especially with phthalates, phosphates, sebacates, adipates, waxes, oils, esters, epoxy compounds, etc., all of which are classes of plasticizers well-known in the art.

Specific examples of such plasticizers include: dioctyl phthalate, dioctyl adipate, tri-2-ethylhexyl phosphate, tricresyl phosphate, di-2-ethylhexyl phthalate, butyl phthalyl, butyl glycolate, methyl epoxy stearate, glyceryl mono-oleate, isopropyl palmitate, dibenzyl sebacate, di(iso-decyl) 4,5-epoxy tetrahydrophthalate, triethyl citrate, and di-n-hexyl azelate.

The plastisol compositions of the present invention consist essentially of polyvinyl chloride and from about 10 to about 200 parts per hundred parts of the polyvinyl chloride of a plasticizer of the type described herein, and from about 0.1 to about 60 parts per hundred parts of the polyvinyl chloride of an aliphatic glycidyl ether of the type described above and exemplified hereinafter. Preferred ranges for these ingredients are 25 to 175 parts per hundred parts of the polyvinyl chloride of the plasticizer and 3 to 20 parts per hundred parts of the polyvinyl chloride of the aliphatic glycidyl ether.

There can also be employed in the compositions of the present invention the usual types of heat and light stabilizers. The purpose of such stabilizers is to provide improved stability characteristics in products prepared from the novel plastisol compositions of the present invention. The employment of these heat and light stabilizers in the present invention is an optional feature but when they are used they should be present in a proportion of from about 0.05 to about 20 parts per hundred parts of the polyvinyl chloride. An important advantage of the aliphatic glycidyl ethers described hereinbefore is that they are compatible with and even enhance the efficacy of substantially all known heat and light stabilizers such as: lead salts, both organic and inorganic and including lead carbonates, sulphates, phosphates, silicates, salicylates, stearates, etc.; other metal soaps or salts including calcium, barium, zinc, lithium, strontium, cadmium, soaps, salts, esters, etc.; tin compounds; oil, waxes and esters including epoxidized varieties; and mixtures of any of the above. Specific examples of such stabilizers are: calcium petronate, tin mercaptide, barium laurate, cadmium laurate, dibasic lead phosphite, lead stearate, dibutyl tin maleate, barium stearate, lead titanate, calcium silicate, barium cadmium laurate, and commercially available stabilizers such as Ba–Cd type Ferro 6V6A (having 4.5% Ba, 2.5% Cd, 1.0% Zn, a specific gravity at 25° C. of 1.00 and manufactured by the Harshaw Chemical Company).

The ethers of this invention are also compatible with other ingredients often found in plastisols such as fillers including clays, silicates, carbonates, carbon black, etc., and also with all types of pigments. This list is given as exemplary and is not intended to be inclusive.

Although this invention is directed primarily to polyvinyl chloride plastisols, it is recognized that the same benefits could be realized in plastisols containing, for example, homopolymers of vinyl chloride and vinylidene chloride and copolymers of polyvinyl chloride and polyvinylidene chloride with polyvinyl alcohol, polyvinyl acetate and polyvinyl acetals. Other monomers that may be copolymerized with the vinyl chloride include the vinyl-type monomers, i.e., monomers containing a single

group, such as, for example, vinylidene chloride or bromide, methyl methacrylate, ethyl methacrylate, ethyl butyl maleate, diethyl maleate, dibutyl fumarate, allyl acetate, methallyl butyrate, acrylonitrile, methacrylonitrile, styrene, vinyl butyl ketone, vinyl ethyl ether, and the like.

Particularly preferred vinyl chloride polymers to be used in the plastisols of this invention include the homopolymers of vinyl chloride and the copolymers of the vinyl halides and ethylenically unsaturated esters, and particularly the alkenyl esters of saturated monocarboxylic acid, and the alkyl esters of the ethylenically unsaturated monocarboxylic acids, which esters preferably contain no more than 12 carbon atoms. The vinyl chloride homopolymers and copolymers are especially preferred as mentioned previously and can be prepared by any of the methods well known in the art such as described in Manufacture of Plastics, volume I by W. Mayo Smith.

The vinyl chloride polymers employed in plastisols can have a molecular weight within the range from about 10,000 to 500,000. The preferred polymers used in the preparation of plastisols are those having a molecular weight as measured by the Staudinger method described in Ind. Eng. Chem., vol. 36, p. 1152 (1936), of at least 15,000 and preferably above 20,000, up to about 400,000. Commercial grades of vinyl chloride polymers having a molecular weight between 100,000 and 200,000 are especially suited for use in the plastisol compositions described herein.

The polyvinyl chloride polymers used in the preparation of plastisol compositions according to the present invention should preferably be of extremely small, essentially spherical particles, having a size of from about 0.1 to about 30 microns in diameter.

Commercially available polyvinyl chloride having the physical characteristics described above is generally known as "dispersion-grade" polyvinyl chloride.

Example I

A plastisol composition (A) was prepared by combining 100 parts of polyvinyl chloride with 60 parts of plasticizer and 2 parts of stabilizer. Plastisol compositions (B) and (C) were prepared in the identical manner as composition (A) except that 10 parts of the plasticizer were replaced with an aliphatic glycidyl ether of this invention. In composition (B) the aliphatic glycidyl ether added had n-alkyl groups with the following chain length distribution: 2%–$C_6$, 18%–$C_8$, 13%–$C_{10}$, 1%–$C_{14}$, 15%–$C_{16}$, 51%–$C_{18}$. In composition (C) the aliphatic glycidyl ether added had n-alkyl groups with the following chain length distribution: 2%–$C_{14}$, 22%–$C_{16}$, 76%–$C_{18}$.

The polyvinyl chloride was Geon 121 which is a dispersion-grade polyvinyl chloride having a particle size of 100% passing through a 200 mesh screen, a specific gravity of 1.4, and a specific viscosity of 0.60. Geon 121 is manufactured by the B. F. Goodrich Chemical Company. The plasticizer was dioctyl phthalate. The stabilizer was a liquid Ba–Cd type Ferro 6V6A having 4.5% Ba, 2.5% Cd, 1.0% Zn, a specific gravity at 25° C. of 1.00 and manufactured by the Harshaw Chemical Company.

The experimental procedure consists of the following steps:

The polyvinyl chloride and stabilizer are measured directly into a Hobart mixing bowl while the plasticizer and glycidyl ether are combined in a separate beaker. The bowl is fastened into position and surrounded by a water bath. Small increments of the plasticizer portion are poured into the bowl and the mixer set on lower speed. When the mix forms small balls of wetted mass, the mixer is run continuously while adding more plasticizer. When enough plasticizer has been added to bring the batch to a homogeneous mixture, the mixer is turned off and the stirrer and bowl scraped to loosen any adhering material. A timer is set for 25 minutes and the mixer is run again at low speed. After 15 minutes, the mixer is stopped and the temperature is recorded, which temperature should be maintained below 90° F. The mixer is again started and the rest of the plasticizer is added. When the 25 minutes have elapsed, mixing is stopped and the plastisol is deaerated by subjecting it to a 5 mm. vacuum for 30 minutes with slight agitation. The plastisol is then poured into an 8 oz. jar and the initial viscosity is measured at 25° C. using a Brookfield Viscosimeter—model LVF and a Brookfield #4 Spindle.

The viscosity values shown in the following Table I represent averages of several experimental runs. Viscosity measurements subsequent to the initial reading described above were made in the same manner, the plastisol being stored at 25° F. in the 8 oz. jars between readings.

TABLE I.—PLASTISOL VISCOSITY

| | Speed of Viscosimeter Spindle, r.p.m. | Compositions (Poise, 25° C. Brookfield #4 Spindle) | | |
|---|---|---|---|---|
| | | No ether added | Ether added | |
| | | (A) | (B) | (C) |
| Initial Viscosity | 2.5 | 80 | 50 | 53 |
| | 5 | 74 | 45 | 48 |
| | 10 | 65 | 40 | 43 |
| | 20 | 60 | 36 | 40 |
| 1 Day | 2.5 | 138 | 112 | 85 |
| | 5 | 121 | 96 | 75 |
| | 10 | 105 | 82 | 67 |
| | 20 | 92 | 68 | 60 |
| 1 Week | 2.5 | 250 | 184 | 140 |
| | 5 | 205 | 145 | 125 |
| | 10 | 170 | 120 | 105 |
| | 20 | 148 | 97 | 90 |
| 2 Weeks | 2.5 | 430 | 181 | 150 |
| | 5 | 250 | 149 | 130 |
| | 10 | 280 | 130 | 120 |
| | 20 | 210 | 114 | 95 |

It will be readily seen from Table I, compositions (B) and (C), that the alkyl glycidyl ether component has a surprisingly beneficial effect upon the viscosity of the plastisol compositions. This is demonstrated by the lower values which appear in the columns headed by (B) and (C).

In addition to the above noted reduction of viscosity, the compositions containing the alkyl glycidyl component, (B) and (C), show viscosity stability over a prolonged period of time. This can be appreciated by studying the left hand column of Table I. For instance, where the initial viscosity at 2.5 r.p.m. of composition (A) was 80, it rose to a markedly high value of 430 after two weeks. This corresponds to a two week shelf life. In contrast, however, the viscosity of compositions (B) and (C) respectively increased from 50 and 53 up to only 181 and 150. Thus, the compositions of this invention, having a low and a stabilized viscosity, offer outstanding advantages to the plastisol fabricator since they allow for much better and efficient processing methods and results.

Example II

Plastisol compositions were prepared in accordance with Example I except that in compositions (B) and (C) (referred to in this example as B' and C') the plasticizer was replaced with 20 parts of the aliphatic glycidyl ether of this invention, these ethers being the same as in compositions (B) and (C) of Example I. Viscosity measurements were made in accordance with Example I and are shown in Table II. Per the discussion in regard to Table I, Table II also vividly illustrates the reduced and stabilized viscosity of the plastisol compositions of this invention.

The outstanding viscosity characteristics of the plastisols of this invention, as observed in Tables I and II, are still observed if the stabilizer component is not present in the composition.

The plasticizer is used in a liquid form and can be any one of the types usually used with polyvinyl chloride. For a complete list of such plasticizers, reference is made to pp. 358–379 of Modern Plastics Encyclopedia, volume 42, No. 1A, September 1964, which is incorporated herein by reference.

TABLE II.—PLASTISOL VISCOSITY

| Speed of Viscosimeter Spindle, r.p.m. | Compositions (Poise, 25° C. Brookfield #4 Spindle) | | |
|---|---|---|---|
| | No ether added (A) | Ether added (B') | Ether added (C') |
| Initial Viscosity  2.5 | 80 | 50 | 29 |
| 5 | 74 | 45 | 26 |
| 10 | 65 | 25 | 24 |
| 20 | 60 | 22 | 22 |
| 1 Day  2.5 | 138 | 71 | 46 |
| 5 | 121 | 62 | 41 |
| 10 | 105 | 52 | 36 |
| 20 | 92 | 43 | 30 |
| 1 Week  2.5 | 250 | 139 | 60 |
| 5 | 205 | 113 | 54 |
| 10 | 170 | 91 | 47 |
| 20 | 148 | 74 | 40 |
| 2 Weeks  2.5 | 430 | 150 | 66 |
| 5 | 350 | 125 | 66 |
| 10 | 280 | 103 | 51 |
| 20 | 210 | 85 | 44 |

The following examples represent specific embodiments of the present invention. The plastisols in these examples are prepared in a manner corresponding to Example I.

Example III

| | Parts |
|---|---|
| Polyvinyl chloride (Geon 121) | 100 |
| Plasticizer (dioctyl phthalate) | 30 |
| Plasticizer (dioctyl adipate) | 25 |
| Hexyl glycidyl ether | 60 |

Example IV

| | Parts |
|---|---|
| Polyvinyl chloride (Geon 121) | 100 |
| Plasticizer (tricresyl phosphate) | 75 |
| Stabilizer (calcium petronate) | 5 |
| Hexacosane glycidyl ether | 50 |

Example V

| | Parts |
|---|---|
| Polyvinyl chloride (Blacar 1716, a dispersion-grade polyvinyl chloride manufactured by Cary Chemical Company) | 100 |
| Plasticizer (methyl epoxy stearate) | 40 |
| Dodecyl glycidyl ether | 40 |

Example VI

| | Parts |
|---|---|
| Polyvinyl chloride (40 parts Marvinol VR10 and 60 parts Marvinol VR50, both dispersion-grade polyvinyl chlorides manufactured by Naugatuck Chemical Company) | 100 |
| Plasticizer (glyceryl monooleate) | 30 |
| Tetradecyl glycidyl ether | 30 |

Example VII

| | Parts |
|---|---|
| Polyvinyl chloride (Blacar 1716) | 100 |
| Plasticizer (dibenzyl sebacate) | 40 |
| Plasticizer (di-n-hexyl azelate) | 50 |
| Hexadecyl glycidyl ether | 20 |

Example VIII

| | Parts |
|---|---|
| Polyvinyl chloride (Geon 121) | 100 |
| Plasticizer (dioctyl adipate) | 100 |
| Stabilizer (tin mercaptide) | 3 |
| Octadecyl glycidyl ether | 1 |

Example IX

| | Parts |
|---|---|
| Polyvinyl chloride (Blacar 1716) | 100 |
| Plasticizer (isopropyl palmitate) | 155 |
| Stabilizer (barium laurate/cadmium laurate in a 1:1 ratio) | 2 |
| Docosyl glycidyl ether | 0.1 |

Example X

| | Parts |
|---|---|
| Polyvinyl chloride (Geon 121) | 100 |
| Plasticizer (tri-2-ethylhexyl phosphate) | 55 |
| n-Alkyl glycidyl ether wherein the alkyl radical contains 5%–$C_6$, 55%–$C_8$, 39%–$C_{10}$, 1%–$C_{12}$ chain lengths | 15 |

Example XI

| | Parts |
|---|---|
| Polyvinyl chloride (Blacar 1716) | 100 |
| Plasticizer (triethyl citrate) | 43 |
| n-Alkyl glycidyl ether wherein the alkyl radical contains 1%–$C_{10}$, 65%–$C_{12}$, 26%–$C_{14}$, 8%–$C_{16}$ chain lengths | 15 |

All of the plastisol compositions of all of the above examples are characterized by a low initial viscosity and/or by a stable viscosity. The compositions containing the higher glycidyl ethers ($C_{12}$–$C_{26}$) are characterized by an especially low viscosity.

The plastisols in all of the above examples which contain the aliphatic glycidyl ethers of this invention, in addition to their low and stable viscosities, exhibit the following advantageous characteristics as compared to the same compositions but not containing said ethers: lower surface tension; easier de-aeration; and appreciable increase in gel temperature. Further, products made from these plastisols (gelled or fused therefrom) exhibit the following advantageous characteristics as compared to products made from the same compositions but not containing the aliphatic glycidyl ethers of this invention: substantially similar strength; lower brittleness temperature; superior heat and light stability.

In all of the preceding examples and otherwise herein, all stated ratios, parts, and percentages are on a weight basis.

What is claimed is:

1. A polyvinyl chloride plastisol composition consisting essentially of spherical polyvinyl chloride particles having a diameter of about 0.1 to about 30 microns, dispersed in about 25 to about 175 parts per hundred parts of polyvinyl chloride in an organic ester polyvinyl chloride plasticizer selected from the group consisting of dioctyl phthalate, dioctyl adipate, tricresyl phosphate, methyl epoxy stearate, glyceryl monooleate, dibenzyl sebacate, di-hexyl azelate, isopropyl palmitate, tri-2-ethylhexyl phosphate, triethyl citrate and containing as a rheological modifier from about 3 to about 20 parts per hundred of polyvinyl chloride of an n-alkyl glycidyl ether wherein the n-alkyl group is based on a blend selected from the group $C_8$–$C_{10}$, $C_{12}$–$C_{14}$, $C_{16}$–$C_{18}$ and mixtures thereof.

2. The plastisol of claim 1 wherein the blend is from 8 to 10 carbon atoms and the plasticizer is dioctyl phthalate.

3. The plastisol of claim 1 wherein the blend is from 12 to 14 carbon atoms and the plasticizer is dioctyl phthalate.

4. The plastisol of claim 1 wherein the blend is from 16 to 18 carbon atoms and the plasticizer is dioctyl phthalate.

References Cited

UNITED STATES PATENTS

| | | | |
|---|---|---|---|
| 3,252,929 | 5/1966 | Meyer | 260—30.4 |
| 2,160,948 | 6/1939 | Wiley | 260—30.4 |
| 3,297,783 | 1/1967 | Bailey | 260—30.4 |
| 2,166,604 | 7/1939 | Meyer | 260—45.8 |

FOREIGN PATENTS 524,832 5/1956 Canada.

JULIUS FROME, *Primary Examiner.*